United States Patent
Brannstrom et al.

(10) Patent No.: US 9,921,065 B2
(45) Date of Patent: Mar. 20, 2018

(54) UNIT AND METHOD FOR IMPROVING POSITIONING ACCURACY

(71) Applicant: VOLVO CAR CORPORATION, Gothenburg (SE)

(72) Inventors: Mattias Erik Brannstrom, Gothenburg (SE); Joakim Lin Sorstedt, Gothenburg (SE); Peter Karlsson, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 15/180,488

(22) Filed: Jun. 13, 2016

(65) Prior Publication Data
US 2016/0377437 A1    Dec. 29, 2016

(30) Foreign Application Priority Data
Jun. 23, 2015   (EP) .................................... 15173380

(51) Int. Cl.
*G01C 21/16*   (2006.01)
*G01C 21/00*   (2006.01)
(Continued)

(52) U.S. Cl.
CPC ......... *G01C 21/165* (2013.01); *G05D 1/0274* (2013.01); *G05D 1/0278* (2013.01)

(58) Field of Classification Search
CPC ........................... B60R 21/0132; B60W 30/00
See application file for complete search history.

(56) References Cited

U.S. PATENT DOCUMENTS 6,477,465 B1 * 11/2002 McCall .................. G01C 21/16
                                                        701/454
7,162,367 B2 *  1/2007 Lin ........................ G01C 21/28
                                                        342/357.57
(Continued)

FOREIGN PATENT DOCUMENTS

| WO | 9109275 A2 | 6/1991 |
| WO | 9109275 A3 | 3/1992 |
| WO | 2014130854 A1 | 8/2014 |

OTHER PUBLICATIONS

Kang Li et al., "Map-Aided GPS/INS Localization Using a Low-Order constrained Unscented Kalman Filter", ThB12.3, Joint 48th IEEE Conference on Decision and Control and 28th Chinese Control Conference, Shanghai, P.R. China, Dec. 16-18, 2009, pp. 4607-4612.

(Continued)

*Primary Examiner* — Krishnan Ramesh
(74) *Attorney, Agent, or Firm* — Brooks Kushman P.C.

(57) ABSTRACT

A unit for improving positioning accuracy of an autonomous vehicle driving on a road includes a first computation unit configured to compute a first position of the vehicle at a time T1 using data from at least an inertial measurement unit (IMU); a second computation unit configured to compute a second position of the vehicle at the time T1 using data from at least one external sensor and a map; a comparison unit configured to compute a position difference between the computed first and second positions; a correction unit configured to correct an error parameter of the IMU, wherein the error parameter is used for correcting a third position of the vehicle computed by the first computation unit at a time T2 with the computed position difference at time T1, if the second computation unit is unable to compute a fourth position of the vehicle at the time T2.

20 Claims, 3 Drawing Sheets

(51) Int. Cl.
  *G05D 1/02*    (2006.01)
  *G01C 21/28*   (2006.01)

(56) References Cited

U.S. PATENT DOCUMENTS

| | | | |
|---|---|---|---|
| 8,655,588 B2 * | 2/2014 | Wong | G01S 17/023 |
| | | | 701/500 |
| 2003/0216865 A1 * | 11/2003 | Riewe | G01C 21/165 |
| | | | 701/470 |
| 2011/0238303 A1 * | 9/2011 | Scherzinger | G01C 15/00 |
| | | | 701/408 |
| 2012/0022780 A1 | 1/2012 | Kulik et al. | |
| 2012/0296566 A1 * | 11/2012 | Ban | G01C 21/165 |
| | | | 701/445 |
| 2015/0127239 A1 * | 5/2015 | Breed | B60R 21/0132 |
| | | | 701/70 |

OTHER PUBLICATIONS

From Wikipedia, the free encyclopedia, "Dead reckoning", https://en.wikipedia.org/wiki/Dead_reckoning, 8 Pages.
Extended European Search Report dated Feb. 25, 2016, Applicant Volvo Car Corporation, 10 Pages.

* cited by examiner

UNIT AND METHOD FOR IMPROVING POSITIONING ACCURACY

CROSS-REFERENCE TO RELATED APPLICATIONS

This application claims foreign priority benefits under 35 U.S.C. § 119(a)-(d) to European patent application number EP 15173380.5, filed Jun. 23, 2015, which is incorporated by reference in its entirety.

TECHNICAL FIELD

Example embodiments presented herein are directed towards a method, a vehicle and a unit for improving positioning accuracy of an autonomous vehicle driving on a road. In particular, the unit comprises a first computation unit configured to compute a first position of the vehicle on the road at a time T1, where the computation is performed using data from at least an inertial measurement unit (IMU); and a second computation unit configured to compute a second position of the vehicle on the road at the time T1.

BACKGROUND

An autonomous vehicle is one which is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities which may not be possible while the vehicle is in a manual driving mode. Examples of such activities are sleeping, working or using multimedia applications. Final segment may be initiated by the driver taking back control of the vehicle to depart the certified road and driving manually until destination is reached.

Self-driving vehicles need highly accurate positioning information to navigate safely along a pre-defined route. To obtain the needed accuracy, the vehicle is equipped with both GPS, camera, radar and lidar sensors, combined with an inertial measurement unit (IMU) for estimating the ego vehicle state in terms of speed, acceleration and rotation. Affordable IMUs typically suffer from bias and scale errors which degrades the positioning accuracy.

Suppliers of IMUs use model based algorithms to estimate and compensate for the bias and scale errors. In addition, some suppliers use information from Doppler-shift radar and cameras with respect to stationary objects to further improve the accuracy of vehicle speed and yaw rate estimation. This compensation is usually sufficient for most vehicle dynamics and active safety functions. However, the requirements for positioning an ego vehicle state estimation for self-driving cars are much higher as compared to existing functionality. Particularly, these requirements are hard to fulfil when driving in environments with few stationary objects or with degraded GPS information, such as in tunnels and in areas with high buildings or objects beside the road.

Dead reckoning is today implemented in some high-end automotive navigation systems in order to overcome the limitations of GPS/GNSS technology alone. Satellite microwave signals are unavailable in parking garages and tunnels, and often severely degraded in urban canyons and near trees due to blocked lines of sight to the satellites or multipath propagation. In a dead-reckoning navigation system, the car is equipped with sensors that know the wheel diameter and record wheel rotations and steering direction. These sensors are often already present in cars for other purposes, such as anti-lock braking system, and electronic stability control, and can be read by the navigation system from the controller-area network bus. The navigation system then uses a Kalman filter to integrate the always-available sensor data with the accurate but occasionally unavailable position information from the satellite data into a combined position fix (see, e.g., http://en.wikipedia.org/wiki/Dead_reckoning).

WO14130854 A1 discloses various techniques for use within a vision-aided inertial navigation system (VINS). A VINS comprises an image source to produce image data comprising a plurality of images, and an inertial measurement unit (IMU) to produce IMU data indicative of a motion of the vision-aided inertial navigation system while producing the image data, wherein the image data captures features of an external calibration target that is not aligned with gravity. The VINS further includes a processing unit comprising an estimator that processes the IMU data and the image data to compute calibration parameters for the VINS concurrently with computation of a roll and pitch of the calibration target, wherein the calibration parameters define relative positions and orientations of the IMU and the image source of the vision-aided inertial navigation system.

US2012022780 AA discloses apparatus and methods for calibrating dynamic parameters of a vehicle navigation system. One method may include determining whether reference position data of a vehicle is available, and measuring composite accelerations of the vehicle. The method may further include generating distance and turn angle data based upon a wheel speed sensors data, computing distance and turn angle errors based upon the independent position data, and associating the distance and turn angle errors with composite accelerations. A second method presented includes calibrating an inertial navigation sensor within a vehicle navigation system. The second method may include determining reference position data and Inertial Navigation System (INS) data, aligning an IMU with the vehicle, and aligning the IMU with an Earth fixed coordinate system. The second method may further include computing the vehicle alignment with respect to a horizontal plane, and determining calibration parameters for distance sensors associated with the vehicle.

SUMMARY

Disclosed is a unit for improving positioning accuracy of an autonomous vehicle driving on a road. The unit comprises a first computation unit configured to compute a first position of the vehicle on the road at a time T1, where the computation is performed using data from at least an inertial measurement unit (IMU). The unit also comprises a second computation unit configured to compute a second position of the vehicle on the road at the time T1, where the computation is performed using data from at least one external sensor and a map. The unit also comprises a comparison unit configured to compute a position difference between the computed first position and the computed second position. The unit also comprises a correction unit configured to correct an error parameter of at least the IMU, where the error parameter is used for correcting a third position of the vehicle computed by the first computation unit at a time T2 with the computed position difference at time T1, if the second computation unit is unable to compute a fourth position of the vehicle at the time T2. The unit also comprises positioning unit configured to decide the position of the vehicle on the road.

Thus it is an advantage that the error parameters of the inertial measurement unit, the IMU can be corrected by comparing the position estimates from the two computation units, the first computation unit and the second computation unit. The corrected error parameters can then be used to compensate for a measured position of vehicle which is not accurate, when an accurate position estimate is not available from the second computation unit using data from at least one external sensor and a map.

The position estimate computed by the first computation unit is performed using data from at least an inertial measurement unit, an IMU, and the problem with IMUs, or at least with affordable IMUs, is that they typically suffer from bias and scale errors and thus provides noise in their measurement which degrades the positioning accuracy.

It is an advantage to make use of the detailed information provided by a map, such as by a high definition (HD) map to increase the use of the IMU and to increase the positioning accuracy. Using all available sensor data, the system is in most scenarios able to accurately position the ego vehicle in the map. In these scenarios, the actual ego vehicle trajectory in global coordinates can be computed. From this trajectory it is possible to compute several reference estimates such as vehicle speed, acceleration and yaw rate. By comparing these reference estimates with similar estimates provided by the IMU, error parameters of the IMU, such as any bias and scale error terms, can be detected and compensated for. This compensation then improves the positioning accuracy in scenarios or cases when the positioning mainly relies on the IMU.

The positioning relies on and is performed by the IMU in cases where the second computation unit cannot compute a position of the vehicle, because external sensor data and/or map data are not available. This can be when driving in environments with few stationary objects, where the external sensors have nothing or very little to measure the vehicle's position relative to, or in scenarios with degraded GPS information, such as in tunnels and in areas with high buildings or objects beside the road, which prevents an unobstructed line of sight to the GPS satellites.

Thus if no data is available to the second computation unit, such as the map not available or data from external sensors are not available, e.g., due to bad weather, bad light conditions, in a tunnel, etc., then the position may be calculated based on the data from the first computation unit, i.e., from the IMU, by correcting this data with the previously measured difference.

However, if and when the second computation unit can compute a position, then data from the second computation unit may be used to decide the position of the vehicle, such as that data from the second computation unit may be used together with the data from the first computation unit to decide the position of the vehicle. Thus the IMU, i.e., IMU sensors, may always be used in the positioning, also in cases where the more precise position estimate from the second computation unit is available. Dead reckoning may be used and may be defined as that a vehicle model and IMU-information may be used to predict the ego vehicle position in between external sensor measurements are received. Thus it is an advantage that two modes may be used in the implementation, where one mode is one in which the error parameters of the IMU are estimated simultaneously as the ego vehicle position is estimated, such as when the information or data from the external sensors and/or from the map are rich and/or such as also depending on how the road is shaped. The other mode of the implementation may be one in which is the error parameters are fixed and not estimated or updated, such as when there is no or not enough information from the external sensors and/or the map. However, in both modes measurements from the IMU may be used to decide the position of the vehicle.

Alternatively, when the second computation unit can compute a position, then data from the second computation may be used to decide the position of the vehicle, such as that data only from or exclusively from the second computation unit may be used to compute and decide the position of the vehicle.

Thus it is an advantage that the improved IMU accuracy lead to an improved positioning, increased availability for self-driving functionality and reduced requirements on other sensors. Furthermore, the improved accuracy will provide for possibilities for new customer functions in other areas.

The error parameters can be estimated when there is sufficient information from the external sensors and/or from the map. Depending on in which environment the ego vehicle is, sometimes the unit, e.g., by using a positioning filter, can estimate both the ego vehicle position and IMU error parameters, and sometimes the unit can only estimate the ego vehicle positioning by means of data from the IMU and then use the most recently estimated error parameters.

The map may be a high-definition (HD) map, a dense map, a hyper map, a data rich map, a high-resolution map, etc., and thus the map data may be high-definition (HD) map data, dense map data, hyper map data, data rich map data, high-resolution map data etc.

The terms first, second, third and fourth position, etc., are used to distinguish between different positions such as to distinguish between positions computed by different computation units, and the terms or order are not meant to contain any information about the position. For example the first position and the second position can be the same position, they can be different positions, the first position can be before, earlier, later, after the second position, etc.

The positions of the vehicle may be in a local coordinate system using local positions, in a global coordinate system using global positions, in a Cartesian coordinate system using x, y, and z points for positions, in a polar coordinate system, in a spherical coordinate system, etc.

Correspondingly, the position difference may be provided in an local coordinate system using local positions, in a global coordinate system using global positions, in a Cartesian coordinate system using x, y, and z points for positions, in a polar coordinate system, in a spherical coordinate system, etc.

The position of the vehicle may be computed from a measured speed, a measured acceleration and/or a measured yaw rate or rotation of the vehicle.

The different time points T are differentiated in by naming them time T1 and time T2. Time T1 is a time point earlier in time than the time point T2, as the data available at time T1 is used at time T2 for correcting the position of the vehicle. As data may be measured constantly or continually or regularly or periodically or at predetermined time internals, there may be a plurality of time points, T1, T2, ... TN at which the position of the vehicle is computed.

The second computation unit may be understood as a reference estimation unit, as the second computation unit provides accurate measurements due to that the data is from the external sensors and the map. Thus the second position measured by the second computation unit is an accurate measure of the vehicle position, and can thus the used as a reference position for correcting or compensating for the inaccurate first position measured by the inaccurate IMU.

If the IMU is very accurate, then the first position and the second position may be identical, in which case there will be no position difference, and in which case there will be no correction of error parameters in the IMU.

However, typically and in most cases, the computed first and second position will not be identical, because the IMU is not accurate, due to noise in the IMU, scale errors, bias etc. The noise of the IMU may change all the time e.g., because the IMU sensors are temperature dependent. The noise may also change over time because of wear, drift, etc. IMU sensors may use model based algorithms to compensate for noise, however such model based compensation is not good enough, i.e., precise enough and reliable enough, for self-driven vehicles.

One or more of the units, i.e., the first computation unit, the second computation unit, the comparison unit and/or the correction unit can be configured in the same physical entity or intermediate unit besides the overall unit. The units can be e.g., central processing units (CPUs), processing units, nodes or cores of a processing unit, etc.

The error parameters of the IMU are due to bias, scale errors, noise, etc. of the IMU. The error parameters of the IMU may be of the sensors of the IMU such as of a gyroscope of the IMU, of accelerometers of the IMU and/or of vehicle or wheel speed sensors which may be separate from the IMU. The wheel speed sensors are internal sensors of the vehicle measuring the rotational velocity of each individual wheel. From these measurements it is possible to estimate e.g., tire pressure and tire wear of the wheels, etc.

An error parameter of at least the IMU is corrected, where the error parameter is used for correcting a third position of the vehicle. Correcting a third position of the vehicle can be to estimate or adjust the position, such as by adding or subtracting a measured position difference. Alternatively and/or additionally, the measured speed, measured acceleration and/or the measured yaw rate can be corrected.

Correcting a third position of the vehicle computed by the first computation unit at a time T2 may be performed with or by or for or using the computed position difference at time T1.

The second computation unit may be unable to or incapable of or fails to or simply does not compute a fourth position of the vehicle at the time T2. This may be due to a lack of GPS signal, e.g., when the vehicle is in a tunnel, it may be due to bad weather obstructing the view of the sensors whereby no sensor output is obtained, it may be due to leaf landing on the sensor, due to snow or rain on the sensor, due to a long straight road where there may be too few or no objects for the external sensors to measure on, etc.

In addition, it is an advantage that the unit can also be used for estimation of individual tire wear and tire pressure. Tire wear and reduced tire pressure will result in a slightly reduced circumference of the tyre that is possible to detect. The reduced circumference will result in an erroneous wheel speed signal from that tire which thus can be detected by the present unit and corresponding method by estimating and/or correcting error parameters of a wheel speed sensor, which is an internal sensor, as an alternative or in addition to correcting the error parameters of the IMU.

In some embodiments the positioning unit is configured to decide the position of the vehicle to be the corrected third position at time T2. This is the case when the second computation unit is unable to compute a fourth position of the vehicle at the time T2.

Thus it is an advantage that the unit is configured to use the positions computed by the first computation unit and corrected with the position difference as input to the positioning unit, when the second computation unit is unable to compute positions of the vehicle.

In some embodiments the positioning unit is configured to decide the position of the vehicle at the time T1 based on both the computed first position from the first computation unit and the computed second position from the second computation unit.

Thus it is an advantage that the unit is configured to use both the positions computed by the first and second computation units as input to the positioning unit, when the second computation unit is able to compute positions of the vehicle.

In some embodiments if the second computation unit is able to compute the fourth position of the vehicle at the time T2, then the positioning unit is configured to decide the position of the vehicle at time T2 based on both the corrected third position from the first computation unit and the computed fourth position from the second computation unit.

Thus it is an advantage that the unit is configured to use the positions computed by both the first and the second computation units as input to the positioning unit, when the second computation unit is able to compute positions of the vehicle.

In some embodiments the second computation unit is configured to compute the second position and the fourth position of the vehicle, when data from the at least one external sensor and/or the map are available.

In some embodiments the map is configured to store information associated with at which locations on the road data from the at least one external sensor is available.

It is an advantage that since the error parameters only can be estimated when there is sufficient information from for example the external sensors, the implementation can be such that it is stored in the map where enough such information exists. Examples of such enough or necessary information could be stationary landmarks, road geometry. Thus it is an advantage that depending on where the ego vehicle is, sometimes the unit, in form of e.g., a positioning filter, would estimate both the ego vehicle position and estimate and/or correct the error parameters of the IMU, i.e., of the IMU sensors, and sometimes the unit will only estimate the ego vehicle positioning and then use previous, such as the most recently, estimated error parameters.

The information can comprise or be positions, such as coordinates, where for example stationary landmarks are present, or where the road geometry is known.

In some embodiments data from the at least one external sensor is available when the at least one external sensor is capable of measuring data.

The external sensor(s) will typically be capable of measuring data at locations where a stationary landmark is present, such as a building, a bridge, a traffic post, etc. and/or at locations where the road geometry is stored in the map. Furthermore, good weather conditions may determine when the external sensors can measure data, e.g., in rainy or snowy weather the external sensors may be disturbed by the rain and snow. The lightning conditions of the environment may also determine whether the external sensors can measure data, for example in darkness in the night, some sensors may not function optimally, etc.

In some embodiments the first and the second computation units are configured to continually and/or regularly and/or periodically and/or at predetermined time intervals compute further positions of the vehicle at times T3, T4, . . . , TN.

Thus it is an advantage that the difference in positions can be computed at predetermined time intervals and thus the error parameters of the IMU can be corrected periodically or regularly, and therefore the positions of the vehicle can be corrected periodically at predetermined time intervals. However when data from the at least one external sensor and/or the map are not available, the second computation unit may not be able to compute the second position, and in this case the position of the vehicle may not be corrected periodically at predetermined time intervals, but may be corrected whenever possible, i.e., when data from the at least one external sensor and/or the map is available.

In some embodiments the first and second computation units are configured to compute the further positions of the vehicle at predetermined first and second time intervals, respectively.

Thus it is an advantage that the time interval between computations may be different for the first and second computation units, for example if data from the external sensors and/or from the map are not available at all time, but only at certain times, such as when stationary landmarks are present or when the road geometry is known. In this case the second computation unit may compute the position of the vehicle more rarely than the first computation unit, since the first computation unit can compute the position of the vehicle at any time, such as every 20 milliseconds (ms). The first and the second time intervals may also be the same time interval, such as every 20 ms, for example when data from the external sensors and/or the map are available.

In some embodiments the first computation unit is configured to compute the positions of the vehicle based on at least a measured speed, a measured acceleration and a measured yaw rate of the vehicle.

Thus the position of the vehicle as calculated based on data from the IMU may be based on a measured speed, a measured acceleration and a measured yaw rate or rotation of the vehicle, where for example the measured acceleration is integrated to obtain a velocity, and the velocity is integrated to obtain a position of the vehicle.

In some embodiments the second computation unit is configured to compute a trajectory of the vehicle in global coordinates from which a computed speed, a computed acceleration and a computed yaw rate or rotation of the vehicle can be computed, and wherein the second computation unit is configured to use the computed speed, the computed acceleration and the computed yaw rate of the vehicle to compute the position of the vehicle.

Thus for example the computed acceleration is integrated to obtain a velocity, and the velocity is integrated to obtain a position of the vehicle.

In some embodiments the data from the map used in the second computation unit comprises one or more of: the maximum speed permitted, the lane size, the number of lanes, any divider in-between lanes, curvature of lane, road geometry, position of road signs, position of guard rails, position of buildings, and/or position of landmarks.

Thus the map may be a high-definition (HD) map, a dense map, a hyper map, a data rich map, a high-resolution map, etc., and accordingly various kinds of information may be present in the map, such as details of the road, details of the surroundings of the road, details of the environment of the road, etc.

In some embodiments the at least one external sensor providing data used in the second computation unit is one or more of: a camera, a radar, a lidar, and/or a satellite navigation system.

Thus the external sensors are typically sensors providing visual measurements of the surroundings, such as of road signs, guard rails, position of landmarks, etc. The satellite navigation system may be the global positioning system (GPS) and/or any other satellite navigation system.

The satellite navigation system may be a system of satellites that provide autonomous geo-spatial positioning. The satellite navigation system allows small electronic receivers to determine their location, such as longitude, latitude, and altitude, to high precision, such as within a few meters, using time signals transmitted along a line of sight by radio from satellites. The signals may also allow the electronic receivers to calculate the current local time to high precision, which allows time synchronization.

In some embodiments the inertial measurement unit (IMU) comprises one or more of a gyroscope, an accelerometer, and/or a magnetometer.

Thus the IMU is capable of measuring in six degrees of freedom, such a position in three dimensions, xyz, and rotation in three dimensions, θx, θy and θz.

In some embodiments the first computation unit is configured to use data from an internal sensor in the vehicle, where the internal sensor is one or more of a wheel speed sensor, an internal vehicle state sensor, a gyroscope, an accelerometer, and/or a magnetometer.

Thus it is an advantage that the position of the vehicle can be determined based also on one or more internal sensors in the vehicle, thereby providing the computed position to be more accurate.

In some embodiments the second computation unit is configured to compute the positions of the vehicle using data from the inertial measurement unit (IMU) used by the first computation unit or from another inertial measurement unit (IMU).

Thus the second computation unit may also use data from an inertial measurement unit (IMU), such as the same IMU as used by the first computation and/or another or second IMU. This may be understood as an alternative to the feature that the unit is configured to use both the positions computed by the first and second computation units as input to the positioning unit, when the second computation unit is able to compute positions of the vehicle, as this also provides that the IMU is used for deciding the position of the vehicle in any case.

According to an aspect disclosed is a vehicle comprising a unit according to any of the preceding embodiments. Thus the vehicle is an autonomous vehicle configured for driving on a road. Thus the vehicle is a vehicle comprising a unit. The unit comprises a first computation unit configured to compute a first position of the vehicle on the road at a time T1, where the computation is performed using data from at least an inertial measurement unit (IMU). The unit also comprises a second computation unit configured to compute a second position of the vehicle on the road at the time T1, where the computation is performed using data from at least one external sensor and a map. The unit also comprises a comparison unit configured to compute a position difference between the computed first position and the computed second position. The unit also comprises a correction unit configured to correct an error parameter of at least the IMU, where the error parameter is used for correcting a third position of the vehicle computed by the first computation unit at a time T2 with the computed position difference at time T1, if the second computation unit is unable to compute a fourth position of the vehicle at the time T2.

According to an aspect disclosed is a method for improving positioning accuracy of an autonomous vehicle driving on a road, where the method is performed in a unit. The method comprises computing a first position of the vehicle on the road at a time T1 in a first computation unit, where the computation is performed using data from at least an inertial measurement unit (IMU). The method comprises computing a second position of the vehicle on the road at the time T1 in a second computation unit, where the computation is performed using data from at least one external sensor and a map. The method comprises computing a position difference between the computed first position and the computed second position in a comparison unit. The method comprises correcting an error parameter of at least the IMU in a correction unit, where the error parameter is used for correcting a third position of the vehicle computed by the first computation unit at a time T2 with the computed position difference at time T1, if the second computation unit is unable to compute a fourth position of the vehicle at the time T2. The method comprises deciding the position of the vehicle on the road in a positioning unit.

According to an aspect disclosed is a computer readable medium comprising program instructions improving positioning accuracy of an autonomous vehicle driving on a road. Execution of the program instructions by one or more processors of a computer system causes the one or more processors to carry out the step of computing a first position of the vehicle on the road at a time T1, where the computation is performed using data from at least an inertial measurement unit (IMU). Execution of the program instructions by the one or more processors of the computer system causes the one or more processors to carry out the step of computing a second position of the vehicle on the road at the time T1, where the computation is performed using data from at least one external sensor and a map. Execution of the program instructions by the one or more processors of the computer system causes the one or more processors to carry out the step of computing a position difference between the computed first position and the computed second position. Execution of the program instructions by the one or more processors of the computer system causes the one or more processors to carry out the step of correcting an error parameter of at least the IMU, where the error parameter is used for correcting a third position of the vehicle computed by the first computation unit at a time T2 with the computed position difference at time T1, if the second computation unit is unable to compute a fourth position of the vehicle at the time T2. Execution of the program instructions by the one or more processors of the computer system causes the one or more processors to carry out the step of deciding the position of the vehicle on the road.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The example embodiments presented herein are described with the use of a vehicle in the form of an automobile. It should be appreciated that the example embodiments presented herein may be applied to any form of vehicle or means of transportation comprising, for example, cars, trucks, busses and construction equipment, as well as airplanes, boats, ships, and space craft.

Autonomous driving allows an occupant of a vehicle, particularly a driver, to engage in activities that would otherwise not be possible while a vehicle is in a manual driving mode. Thus, at least one example object of some of the example embodiments described herein is to provide a system in which a driver and/or passenger of a vehicle may schedule activities during an autonomous driving mode which may not necessarily be possible during a manual driving mode.

An inertial measurement unit (IMU) is an electronic device that measures and reports the vehicles velocity, orientation, and e.g., gravitational forces, using a combination of accelerometers and gyroscopes, sometimes also magnetometers. The IMU can thus be used to maneuver a vehicle, such as an autonomous or self-driving car.

The data collected from the IMUs sensors allows a computer or computing unit to track the vehicle's position, using a method known as dead reckoning.

The inertial measurement unit (IMU) works by detecting the current rate of acceleration using one or more accelerometers, and detects changes in rotational attributes like pitch, roll and yaw using one or more gyroscopes, as the vehicle may be considered to be driving on a 3D road. The IMU may also comprise a magnetometer, e.g., for assisting in calibration against orientation drift.

An inertial navigation system may comprise an IMU which have angular and linear accelerometers for changes in position. The IMU may comprise a gyroscopic element for maintaining an absolute angular reference.

Angular accelerometers measure how the vehicle is rotating in space, as the vehicle may be considered to be driving on a 3D road. Generally, there is at least one sensor for each of the three axes: pitch which corresponds to nose up and down, yaw which corresponds to nose left and right, and roll which corresponds to clockwise or counter-clockwise from the cockpit.

Linear accelerometers measure non-gravitational accelerations of the vehicle. Since it can move in three axes, up and down, left and right, forward and back, there is a linear accelerometer for each axis.

A computer or computing unit continually calculates the vehicle's current position. First, for each of the six degrees of freedom, x, y, z and θx, θy and θz, it integrates over time the sensed acceleration, together with an estimate of gravity, to calculate the current velocity. Then it integrates the velocity to calculate the current position.

The IMU may be a box containing three accelerometers and three gyroscopes and optionally three magnetometers. The accelerometers are placed such that their measuring axes are orthogonal to each other. They measure inertial acceleration, also known as G-forces. Three gyroscopes are placed in a similar orthogonal pattern, measuring rotational position in reference to an arbitrarily chosen coordinate system. Three magnetometers may also be included in IMUs. This allows better performance for dynamic orientation calculation in altitude and heading reference systems which base on IMUs.

A wheel speed sensor or vehicle speed sensor (VSS) is a type of tachometer. It is a sender device used for reading the speed of a vehicle's wheel rotation. It usually consists of a toothed ring and pickup. Error parameters of the wheel speed sensor may be estimated according to the present unit and method.

Figure 1:
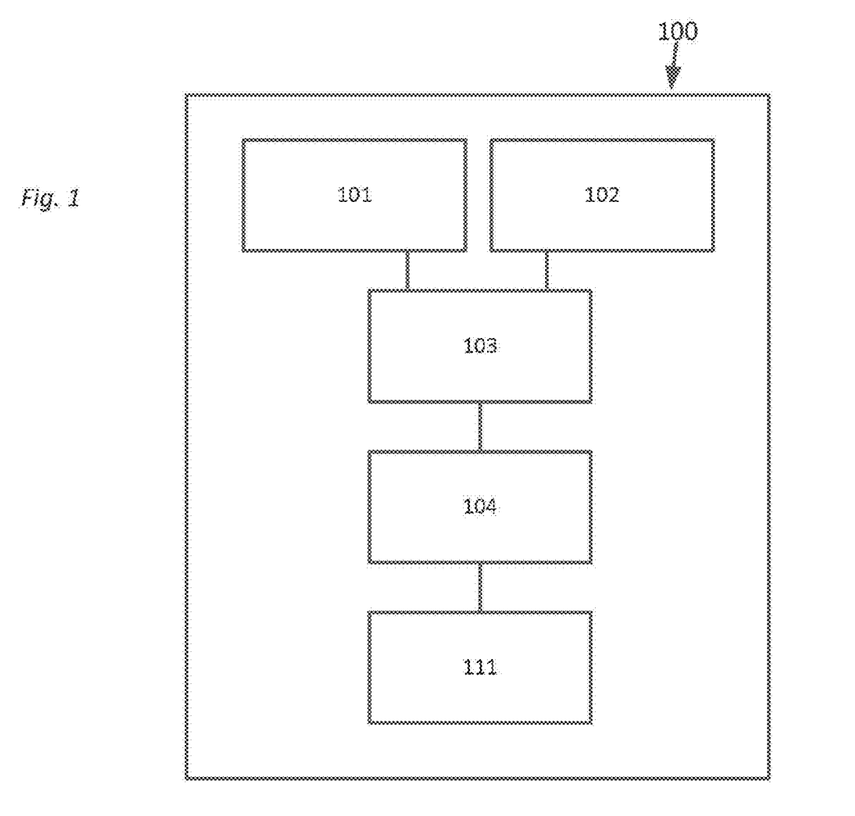
FIG. 1 shows an illustrative example of a unit for improving positioning accuracy of an autonomous vehicle driving on a road.

FIG. 1 shows an illustrative example of an arrangement or unit 100 for improving positioning accuracy of an autonomous vehicle driving on a road.

The unit 100 comprises a first computation unit 101 configured to compute a first position of the vehicle on the road at a time T1, where the computation is performed using data from at least an inertial measurement unit (IMU).

The unit 100 comprises a second computation unit 102 configured to compute a second position of the vehicle on the road at the time T1, where the computation is performed using data from at least one external sensor and a map.

The unit 100 comprises a comparison unit 103 configured to compute a position difference between the computed first position and the computed second position.

The unit 100 comprises a correction unit 104 configured to correct an error parameter of at least the IMU, where the error parameter is used for correcting a third position of the vehicle computed by the first computation unit 101 at a time T2 with the computed position difference at time T1, if the second computation unit 102 is unable to compute a fourth position of the vehicle at the time T2.

The unit 100 comprises a positioning unit 111 configured to decide the position of the vehicle 203 on the road 305. The decided position of the vehicle on the road at any time may be based on the computed and/or corrected positions from the first and/or the second computation unit depending on whether the second computation unit is able to compute the position of the vehicle.

Figure 2:
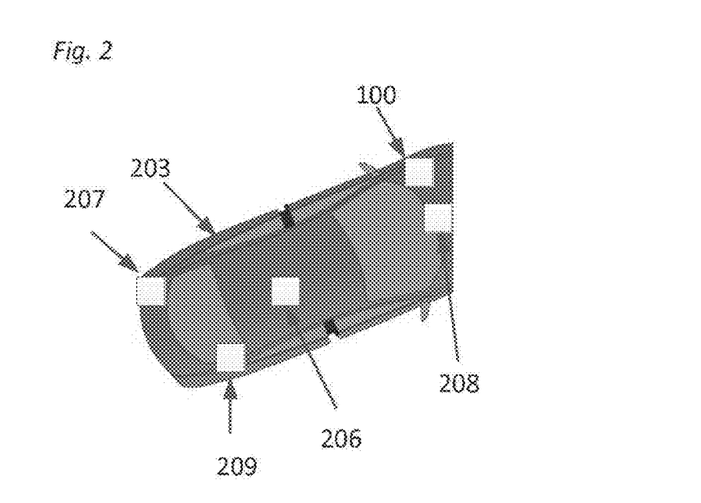
FIG. 2 schematically illustrates an autonomous vehicle comprising a unit for improving positioning accuracy of the vehicle.

FIG. 2 schematically illustrates an autonomous vehicle 203 comprising a unit 100 for improving positioning accuracy of the vehicle 203 driving on a road. The vehicle comprises an inertial measurement unit (IMU) 206 configured to provide data to the first computation unit. The vehicle comprises at least one external sensor 207 and a map 208 configured to provide data to the second computation unit. The vehicle may also comprise a internal sensor 209 configured to provide data to the first computation unit. The unit 100, the IMU 206, the external sensor 207, the map 208 and/or the internal sensor 209 may be placed in other positions in the vehicle 203 than shown on the figure.

Figure 3:
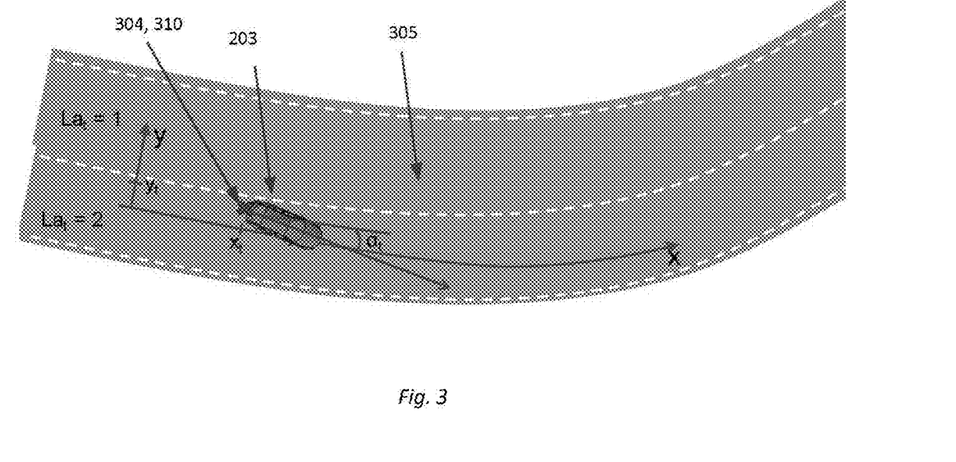
FIG. 3 shows a schematic example of the vehicle position on the road.

FIG. 3 shows a schematic example of the ego vehicle position. The first computation unit is configured to compute a first position 304. The second computation unit is configured to compute a second position 310. Depending on the accuracy of the computations, the first 304 and the second 310 position may be the same position or different positions. The ego vehicle positions 304, 310 of the vehicle 203 on the road 305 may be expressed in a curved coordinate system (xt; yt) as is shown in FIG. 3. Here, xt is the longitudinal position along the road 305 at time t, and yt is the lateral position in the lane. Additionally an ego vehicle positioning filter, or positioning filter, may estimate the heading angle αt relative to the lane and a discrete parameter Lat which corresponds to in which lane the ego vehicle 203 is positioned. Thus the heading angle αt is a direction or orientation relative to the lane and the heading angle αt may correspond to an orientation, a direction, etc. Lat=1 corresponds to a one or a first lane, and Lat=2 corresponds to another or a second lane.

The state vector of the positioning filter may be defined as $x_t=[x_t \; y_t \; \alpha_t \; L_{at}]^T$, and the measurements from a sensor i collected at a time ti may be stored in a vector $z^i_t$. All sensor observations retrieved up to time t may be represented by $Z_{0:t}$.

Figure 4:
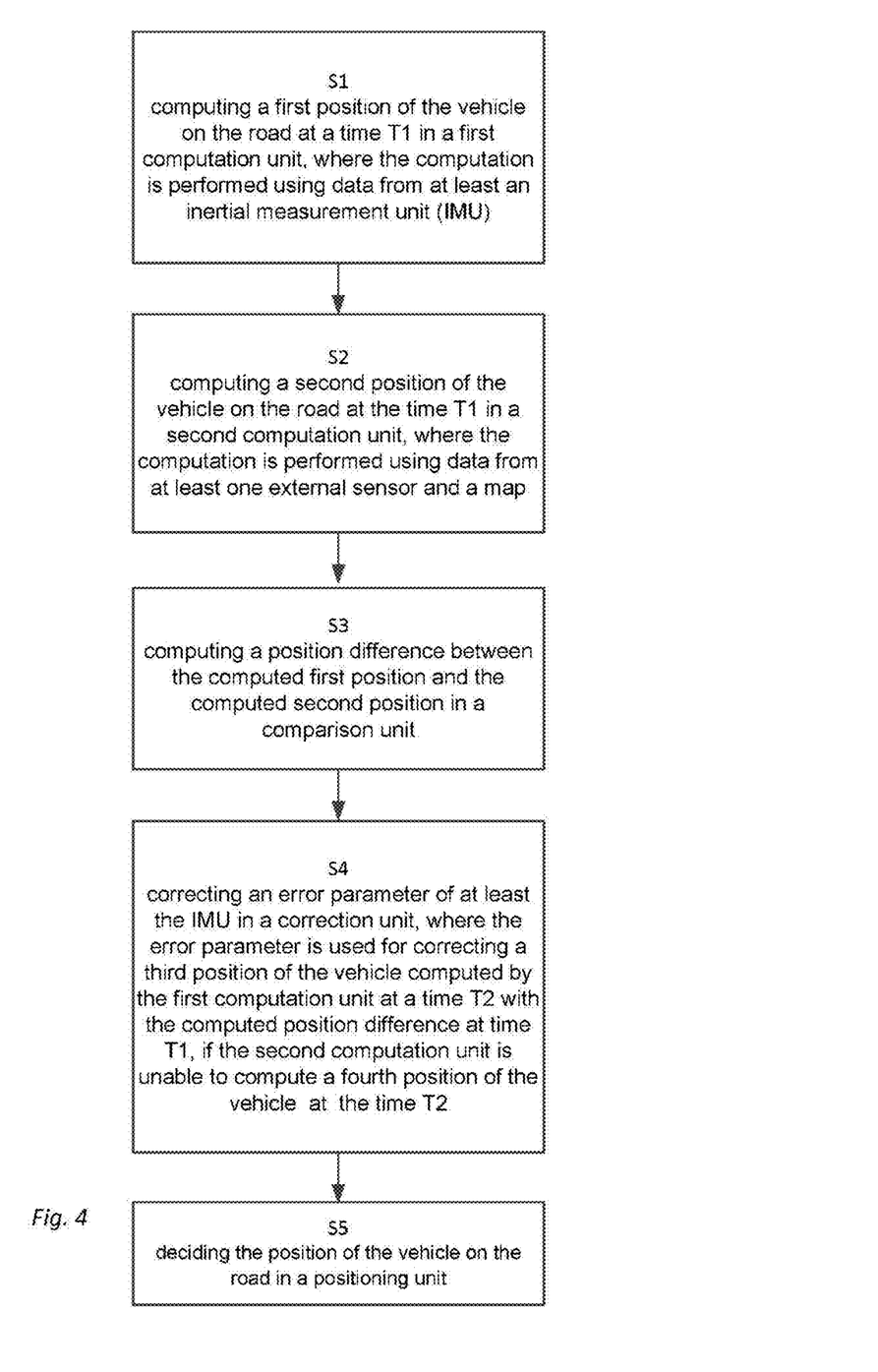
FIG. 4 illustrates a flow chart of a method for improving positioning accuracy of an autonomous vehicle driving on a road.

FIG. 4 illustrates a flow chart of a method for improving positioning accuracy of an autonomous vehicle (203) driving on a road (305), where the method is performed in a unit (100). The method comprises:

computing (S1) a first position of the vehicle on the road at a time T1 in a first computation unit, where the computation is performed using data from at least an inertial measurement unit (IMU);

computing (S2) a second position of the vehicle on the road at the time T1 in a second computation unit, where the computation is performed using data from at least one external sensor and a map;

computing (S3) a position difference between the computed first position and the computed second position in a comparison unit;

correcting (S4) an error parameter of at least the IMU in a correction unit, where the error parameter is used for correcting a third position of the vehicle computed by the first computation unit at a time T2 with the computed position difference at time T1, if the second computation unit is unable to compute a fourth position of the vehicle at the time T2; and deciding (S5) the position of the vehicle on the road in a positioning unit.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As one skilled in the art would understand, any of the above-mentioned units and other components, such as components 100, 101, 102, 103, 104, 111 and 206, may include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular component may perform particular algorithms represented by the functions and/or operations described herein. Each unit and other component (e.g., 100, 101, 102, 103, 104, 111 and 206) may also, or instead, include one or more application specific integrated circuits, programmable gate arrays or programmable array logic, programmable logic devices, or digital signal processors.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A unit for improving positioning accuracy of an autonomous vehicle driving on a road, the unit comprising:
   a first computation unit configured to compute a first position of the vehicle on the road at a time T1 using data from at least an inertial measurement unit (IMU);
   a second computation unit configured to compute a second position of the vehicle on the road at the time T1 using data from at least one external sensor and a map;
   a comparison unit configured to compute a position difference between the computed first position and the computed second position;
   a correction unit configured to correct an error parameter of at least the IMU, wherein if the second computation unit is unable to compute a fourth position of the vehicle at a time T2, then the error parameter is used for correcting a third position of the vehicle computed by the first computation unit at time T2 with the computed position difference at time T1; and
   a positioning unit configured to decide the position of the vehicle on the road.

2. The unit according to claim 1 wherein the positioning unit is configured to decide the position of the vehicle to be the corrected third position at time T2.

3. The unit according to claim 1 wherein the positioning unit is configured to decide the position of the vehicle at the time T1 based on both the computed first position from the first computation unit and the computed second position from the second computation unit.

4. The unit according to claim 3 wherein if the second computation unit is able to compute the fourth position of the vehicle at the time T2, then the positioning unit is configured to decide the position of the vehicle at time T2 based on both the corrected third position from the first computation unit and the computed fourth position from the second computation unit.

5. The unit according to claim 4 wherein the second computation unit is configured to compute the second position and the fourth position of the vehicle, when data from the at least one external sensor and/or the map are available.

6. The unit according to claim 3 wherein the first and the second computation units are configured to periodically and/or at predetermined time intervals compute further positions of the vehicle at times T3, T4, . . . , TN.

7. The unit according to claim 3 wherein the at least one external sensor for providing data for use in the second computation unit is one or more of: a camera, a radar, a lidar, a satellite navigation system.

8. The unit according to claim 1 wherein if the second computation unit is able to compute the fourth position of the vehicle at the time T2, then the positioning unit is configured to decide the position of the vehicle at time T2 based on both the corrected third position from the first computation unit and the computed fourth position from the second computation unit.

9. The unit according to claim 8 wherein the second computation unit is configured to compute the second position and the fourth position of the vehicle, when data from the at least one external sensor and/or the map are available.

10. The unit according to claim 1 wherein the second computation unit is configured to compute the second position and the fourth position of the vehicle, when data from the at least one external sensor and the map are available.

11. The unit according to claim 1 wherein the map is configured to store information associated with locations on the road at which data from the at least one external sensor is available.

12. The unit according to claim 1 wherein data from the at least one external sensor is available when the at least one external sensor is capable of measuring data.

13. The unit according to claim 1 wherein the first and the second computation units are configured to periodically and/or at predetermined time intervals compute further positions of the vehicle at times T3, T4, . . . , TN.

14. The unit according to claim 1 wherein the data from the map usable in the second computation unit comprises one or more of: maximum speed permitted, lane size, number of lanes, any divider in-between lanes, curvature of lane, road geometry, position of road signs, position of guard rails, position of buildings, and/or position of landmarks.

15. The unit according to claim 1 wherein the at least one external sensor for providing data for use in the second computation unit is one or more of: a camera, a radar, a lidar, a satellite navigation system.

16. The unit according to claim 1 wherein the first computation unit is configured to use data from an internal sensor in the vehicle, wherein the internal sensor is one or more of a wheel speed sensor, an internal vehicle state sensor, a gyroscope, an accelerometer, a magnetometer.

17. The unit according to claim 1 wherein the second computation unit is configured to compute the positions of the vehicle using data from the IMU usable by the first computation unit or from another IMU.

18. A vehicle comprising a unit according to claim 1.

19. A method for improving positioning accuracy of an autonomous vehicle driving on a road, wherein the method is performed in a unit, the method comprising:
   computing a first position of the vehicle on the road at a time T1 in a first computation unit, wherein the computation is performed using data from at least an inertial measurement unit (IMU);
   computing a second position of the vehicle on the road at the time T1 in a second computation unit, wherein the computation is performed using data from at least one external sensor and a map;
   computing a position difference between the computed first position and the computed second position in a comparison unit;
   correcting an error parameter of at least the IMU in a correction unit, wherein if the second computation unit is unable to compute a fourth position of the vehicle at a time T2, then the error parameter is used for correcting a third position of the vehicle computed by the first computation unit at the time T2 with the computed position difference at time T1; and
   deciding the position of the vehicle on the road in a positioning unit.

20. A non-transitory computer readable medium comprising program instructions for improving positioning accuracy of an autonomous vehicle driving on a road, wherein the program instructions are executable by one or more processors of a computer system to:
   compute a first position of the vehicle on the road at a time T1 using data from at least an inertial measurement unit (IMU);
   compute a second position of the vehicle on the road at the time T1 using data from at least one external sensor and a map;
   compute a position difference between the computed first position and the computed second position;
   correct an error parameter of at least the IMU, wherein if the second computation unit is unable to compute a fourth position of the vehicle at a time T2, then the error parameter is used for correcting a third position of the vehicle computed by the first computation unit at a time T2 with the computed position difference at time T1; and
   decide the position of the vehicle on the road.

* * * * *